United States Patent

Dolfini

[11] 3,920,639
[45] Nov. 18, 1975

[54] CYANOMETHYLTHIOACETYL-7-METHOXYCEPHALOSPORINS

[75] Inventor: Joseph Edward Dolfini, Princeton, N.J.

[73] Assignee: E. R. Squibb & Sons, Inc., Princeton, N.J.

[22] Filed: Apr. 23, 1973

[21] Appl. No.: 353,273

[52] U.S. Cl. .................. 260/243 C; 260/247.1 R; 260/294.8 G; 260/302 R; 260/307 R; 260/307 H; 260/332.2 A; 260/347.3; 260/347.4; 260/465 D; 424/246
[51] Int. Cl.² ..... C07D 501/28; C07D 501/36; C07D 501/40; A61K 31/545
[58] Field of Search ............................. 260/243 C

[56] References Cited
UNITED STATES PATENTS 3,796,709  3/1974  Breuer et al. .................. 260/243 C Primary Examiner—Paul M. Coughlan, Jr.
Assistant Examiner—Diana G. Rivers
Attorney, Agent, or Firm—Lawrence S. Levinson; Merle J. Smith

[57] ABSTRACT
New cyanomethylthioacetyl-7-methoxycephalosporins of the following general formula,

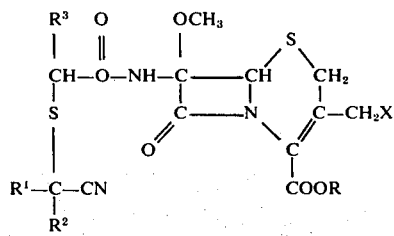

wherein R is a hydrogen, lower alkyl, haloloweralkyl, aralkyl, tri(lower alkyl)silyl, a salt forming ion or the group

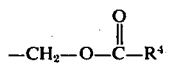

and $R^2$ each is hydrogen, lower alkyl, lower alkenyl, aryl or aralkyl, each of which may be substituted, or $R^1$ $R^2$ may together complete a carbocyclic ring; $R^3$ is hydrogen, lower alkyl, lower alkenyl, cyclo-lower alkyl, unsaturated cyclo-lower alkyl, aryl, aralkyl or a heterocyclic group; $R^4$ is lower alkyl, aryl or aralkyl and X is hydrogen, acetoxy, pyridinyl-1-oxo-2-thio, 3-methyl-1,2,4-thiadiazolyl-thio, 1-methyltetrazolyl-5-thio, 2-methyl-1,3,4-thiadiazolyl-5-thio, heterocyclylthio, carbamoyloxy, the radical of a nitrogen base, or a quaternary ammonium radical are useful as antibacterial agents.

11 Claims, No Drawings

CYANOMETHYLTHIOACETYL-7-METHOXYCEPHALOSPORINS

SUMMARY OF THE INVENTION

This invention relates to new antibacterial cyanomethylthioacetyl-7methoxycephalosporins which have the formula

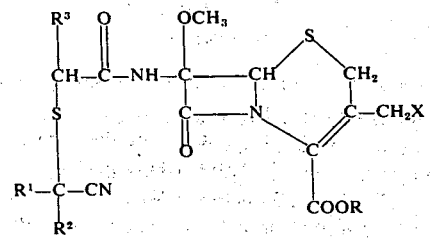

R represents hydrogen, alkyl of 1 to 3 carbon atoms, haloloweralkyl of 1 to 3 carbons, e.g., trichloroethyl, benzyl, benzhydryl, phenethyl, trialkylsilyl wherein the alkyl radical has 1 to 4 carbon atoms, a salt forming ion or the group

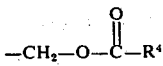

wherein $R^4$ represents alkyl of 1 to 5 carbon atoms, phenyl or benzyl; $R^1$ and $R^2$, which may be the same or different, each represents hydrogen, alkyl of 1 to 5 carbon atoms, alkenyl of 2 to 5 carbon atoms, phenyl, benzyl or phenethyl, each of which (other than hydrogen) may be substituted with halogen, alkyl of 1 to 3 carbon atoms or alkoxy of 1 to 3 carbon atoms; $R^1$ and $R^2$, in addition, may form a carbocyclic ring with the carbon to which they are attached; $R^3$ represents hydrogen, alkyl of 1 to 5 carbon atoms, alkenyl of 2 to 5 carbon atoms, cycloalkyl of 4 to 7 carbon atoms, unsaturated cycloalkyl of 4 to 7 carbon atoms, or 5- or 6-membered monocyclic heterocyclic radicals containing nitrogen, sulfur or oxygen in the ring in addition to carbon but not more than 2 heteroatoms, benzyl, phenyl or phenyl which may be substituted with halogen, hydroxy, amino, alkyl of 1 to 3 carbon atoms or alkoxy of 1 to 3 carbon atoms;

X is hydrogen, acetoxy pyridinyl-1-oxo-2-thio, 3-methyl-1,2,4-thiadiazolylthio, 1-methyltetrazolyl-5-thio, 2-methyl-1,3,4-thiadiazolyl-5-thio, carbamoyloxy, the radical of a nitrogen base or a quaternary ammonium radical.

The preferred members within each group are as follows: R is hydrogen, or a salt forming ion, especially an alkali metal like sodium or potassium; $R^1$ and $R^2$ each is hydrogen or alkyl of 1 to 5 carbon atoms, especially methyl or ethyl, alkenyl of 2 to 5 carbon atoms, especially allyl, phenyl, hydroxyphenyl, chlorophenyl, benzyl or phenethyl, most preferably $R^2$ is hydrogen when $R^1$ is other than hydrogen, and also $R^1$ and $R^2$ together complete the cyclopentyl or cyclohexyl ring; $R^3$ is hydrogen, alkyl of 1 to 5 carbon atoms, especially methyl or ethyl, alkenyl of 2 to 5 carbon atoms, especially allyl, cyclopentyl, cyclohexyl, phenyl, hydroxyphenyl, aminophenyl, chlorophenyl, benzyl, furyl, thienyl, pyrrolidyl or pyridyl; and X is hydrogen, acetoxy pyridinyl-1-oxo-2-thio, 3-methyl-1,2,4-thiazdiazolylthio, 1-methyl-tetrazolyl-5-thio, 2-methyl-1,3,4-thiadiazolyl-5-thio, carbamoyloxy, or pyridinium. The 7-methoxy group occupies the α-configuration.

DETAILED DESCRIPTION OF THE INVENTION

The various groups represented by the symbols have the meanings defined below and these definitions are retained throughout this specification.

The alkyl groups are straight or branched chain hydrocarbon radicals having one to seven carbons in the chain, for example; methyl, ethyl, propyl, isopropyl, butyl, isobutyl, t-butyl, amyl or the like. The alkenyl groups are double bonded, monounsaturated hydrocarbon radicals of the same type, the two to four carbon members being preferred, especially allyl.

The cycloalkyl groups included cycloaliphatic groups having four to seven carbons in the ring as cyclobutyl, cyclopentyl, cyclohexyl and cycloheptyl. The cyclic groups may also be unsaturated, e.g., cycloalkenyl and cycloalkadienyl groups of the same type, e.g., cyclobutenyl, cyclopentenyl, cyclohexenyl, cyclopentadienyl, cyclohexadienyl, etc. The double bond or bonds may be variously located. A preferred radical is the 1,4-cyclohexadienyl group.

The foregoing may be simply substituted as defined above, with one to three groups such as halogen, hydroxy, amino, alkyl of 1 to 3 carbon atoms or alkoxy, preferably only one substituent.

The substituted phenyl radicals contain one to three substituents (preferably only one) as defined above.

X also represents the radical of an amine, e.g., a lower alkylamine like methylamine, ethylamine, dimethylamine, triethylamine, phenyl-lower alkylamine like dibenzylamine, phenyl-lower alkylpyridinium like N,N'-dibenzylpyridinium, 1-pyridinium, 1-quinolinium, 1-picolinium, etc.

The heterocyclic groups represented by $R^3$ are 5- to 6-membered monocyclic heterocyclic radicals (exclusive of hydrogen) containing nitrogen, sulfur or oxygen in the ring in addition to carbon (not more than two hetero atoms), and members of this group simply substituted as discussed above with respect to the phenyl groups. The heterocyclic radicals include pyridyl, pyrrolidyl, morpholinyl, thienyl, furyl, oxazolyl, isoxazolyl, thiazolyl and the like, as well as the simply substituted members, especially the halo, alkyl of 1 to 3 carbon atoms (particularly methyl and ethyl), alkoxy of 1 to 3 carbon atoms, (particularly methoxy and ethoxy), phenyl and hydroxyalkyl of 1 to 3 carbon atoms (particularly hydroxymethyl and hydroxyethyl) substituted members.

The salt forming ions may be metal ions, e.g., aluminum, alkali metal ions such as sodium or potassium, alkaline earth metal ions such as calcium or magnesium or an amine salt ion, of which a number are known for this purpose, for example, aralkylamine like, dibenzylamine, N,N'-dibenzylethylenediamine, lower alkylamine like methylamine, triethylamine, procaine, lower alkylpiperidine like N-ethylpiperidine, etc.

The compounds of formula I wherein X is H, acetoxy or carbamoyloxy are produced by acylating a compound of the formula (II)

(II)

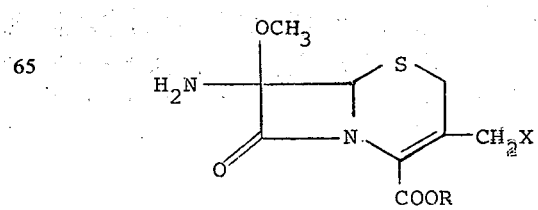

wherein R has the meaning defined above, with a reactive derivative of an acid of the formula (III) 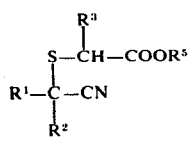

wherein $R^1$, $R^2$ and $R^3$ have the meaning defined above and $R^5$ in this case is hydrogen.

The reactive derivatives of the acids of formula III include, for example, acid halides, acid anhydrides, mixed anhydrides of the acid with carbonic acid monoesters, trimethylacetic acid or benzoic acid, acid azides, active esters like cyanomethyl ester, p-nitrophenyl ester or 2,4-dinitrophenylester, or active amides like acylimidazoles.

An acid of formula III may also be reacted with a compound of formula II in the presence of a carbodiimide, for example, N,N-dicyclohexylcarbodiimide, an isoxazolium salt, for example, N-ethyl-5-phenylisoxazolium-3-sulfonate or 2-ethoxy-1,2-dihydroquinoline-1-carboxylic acid ester.

The acids of formula III and their esters of formula VI are new compounds which may be produced from the corresponding derivatives of haloacetonitriles having the formula (IV) 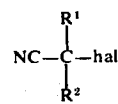

wherein $R^1$ and $R^2$ have the meaning defined above and hal is halogen, especially chlorine, by reaction with a thioacetic acid ester of the formula (V) 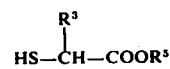

wherein $R^3$ has the meaning defined above and $R^5$ here is lower alkyl, especially methyl or ethyl, in the presence of an acid binding agent. The ester formed by this reaction has the formula (VI) 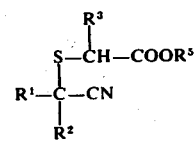

and this is converted, at the conclusion of that reaction, to the free acid of formula III by conventional saponification.

Alternatively, acids of formula III, i.e., wherein $R^5$ is hydrogen may be produced directly by reacting a haloacetonitrile of formula IV with a thioacetic acid of formula V, i.e., $R^5$ is hydrogen in formula V, in the presence of a base, e.g., an alkylamine like triethylamine.

An alternate process for the production of a compound of formula III is by the reaction of a thioacetonitrile of the formula (VII) 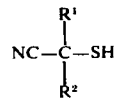

with a haloacetic acid of the formula (VIII) 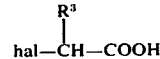

wherein hal is halogen, preferably chlorine, in the presence of an acid binding agent.

Another route for the synthesis of the esters of formula III, i.e., wherein $R^5$ is lower alkyl, is by converting an ester of halomethylmercaptoacetic acid [C.A. 58, 5630 (1963)] with an alkali metal cyanide (MCN) as follows:

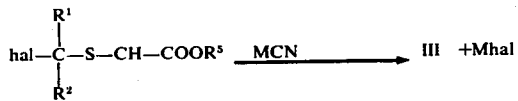

Compounds of formula II wherein R is heterocyclythio or pyridinium may be obtained from an acylated 7-AMCA by methods known in the art for the formation of 7-aminocephalosporanic acid analogs, e.g., Abraham and Newton (1950) Ciba Foundation Symposium, Amino Acids, Peptides, Antimetabolic Activity, p. 205; U.S. Pat. No. 3,225,038; and Belgian Pat. Nos. 641,338 and 652,148.

The carboxylate salts of the compounds (I) of the present invention are formed by reacting the carboxyl group of the 7-amino-7-methoxycephalosporanic acid (7-AMCA) or 7-amino-7-methoxy-3-desacetoxycephalosporanic acid (7-AMDCA) moiety with a salt-forming ion, e.g., an alkali metal such as sodium or potassium, or an alkaline earth metal such as magnesium or calcium, or a metal of group IIIA such as aluminum, or the radical of an organic base such as dibenzylamine, N-N'-dibenzylethylenediamine or other organic bases known to form salts with cephalosporanic acids.

The lower alkyl esters may be obtained by esterifying the carboxyl groups of the 7-AMCA or 7-AMDCA moiety with a straight or branched chain lower alkyl halide of from 1 to 3 carbon atoms, e.g., methyl chloride, ethyl bromide, and the like, or with a diazoalkane of from 1 to 3 carbon atoms, e.g., diazomethane, diazoethane, and the like. The resulting ester group is then formed by a radical such as methyl, ethyl, propyl or isopropyl.

The acyloxymethyl esters may be obtained according to known methods, for example a method adapted from that of Daehne et al., J. Med. Chem. 13, 607 (1970), by reacting the carboxyl group or a metal salt thereof of the 7-AMCA or 7-AMDCA moiety with a halide of the formula (IX)

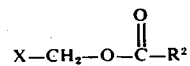

wherein R² may be alkyl of up to 5 carbon atoms, phenyl, benzyl or phenethyl, and hal is chlorine or bromine. Thus, suitable compounds include acetoxymethyl chloride, propionyloxymethyl chloride, butyryloxymethyl chloride, pivaloyloxymethyl chloride, valeryloxymethyl chloride, benzoyloxymethyl chloride, or phenacetoxymethyl chloride, and the like. The alkanoyloxymethyl radical may be introduced into the 7-AMCA or 7-AMDCA moiety either prior to or subsequent to the reaction with the acylating agent by treatment with 1 or 2 moles of a halomethyl ester of formula

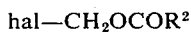

hal—CH₂OCOR²

(X)

It will be appreciated that certain of the compounds of this invention exist in various states of solvation as well as in different optically active forms. The various forms as well as their mixtures are within the scope of this invention.

The compounds of this invention have a broad spectrum of antibacterial activity against both gram positive and gram negative organisms such as *Staphylococcus aureus*, *Salmonella schottmuelleri*, *Proteus vulgaris*, *Escherichia coli* and *Streptococcus pyogenes*. They may be used as antibacterial agents in a propylactic manner, e.g., in cleaning or disinfecting compositions, or otherwise to combat infections due to organisms such as those named above, and in general may be utilized in a manner similar to cephalosporin C, cephalothin and other cephalosporins. For example, a compound of formula I or a physiologically acceptable salt or ester thereof may be used in various animal species in an amount of about 1 to 200 mg./kg. daily, orally or parenterally, in single or two to four divided doses to treat infections of bacterial origin.

Up to about 600 mg. of a compound of formula I or a pharmaceutically acceptable salt or ester thereof may be incorporated in an oral dosage form such as tablets, capsules or elixirs or in an injectable form in a sterile aqueous vehicle prepared according to conventional pharmaceutical practice.

In cleaning or disinfecting compositions, e.g., in barns or dairy equipment, a concentration of about 0.01 to 1% by weight of such compounds admixed with, suspended or dissolved in conventional inert dry or aqueous carriers for application by washing or spraying may be used.

They are also useful as nutritional supplements in animal feeds.

The compounds of the present invention in the described dosages may be administered orally; however, other routes such as intraperitoneally, subcutaneously, intramuscularly or intravenously may be employed.

The active compounds of the present invention are orally administered, for example, with an inert diluent or with an assimilable edible carrier, or they may be enclosed in hard or soft gelatin capsules, or they may be compressed into tablets, or they may be incorporated directly with the food of the diet. For oral therapeutic administration, the active compounds of this invention may be incorporated with excipients and used in the form of tablets, troches, capsules, elixirs, suspensions, syrups, wafers, chewing gum, and the like. The amount of active compound in such therapeutically useful compositions or preparations is such that a suitable dosage will be obtained.

The tablets, troches pills, capsules and the like may also contain the following: a binder such as gum tragacanth, acacia, corn starch or gelatin; an excipient such as dicalcium phosphate; a disintegrating agent such as corn starch, potato starch, alginic acid and the like; a lubricant such a magnesium stearate; and a sweetening agent such as sucrose, lactose or saccharin may be added or a flavoring agent such as peppermint, oil of wintergreen, or cherry flavoring. When the dosage unit form is a capsule, it may contain in addition to materials of the above type a liquid carrier such as a fatty oil. Various other materials may be present as coatings or to otherwise modify the physical form of the dosage unit, for instance, tablets, pills or capsules may be coated with shellac, sugar, or both. A syrup or elixir may contain the active compounds, sucrose as a sweetening agent, methyl and propyl parabens as preservatives, a dye and a flavoring such as cherry or orange flavor. Of course, any material used in preparing any dosage unit form should be pharmaceutically pure and substantially non-toxic in the amounts employed.

The 7-AMCA or 7-AMDCA compound selected for the coupling reactions in the following examples are chosen with the 7-α-methoxy configuration.

The following examples illustrate the present invention without, however, limiting the same thereto.

EXAMPLE 1

7-[2-[(Cyanomethyl)thio]acetamido]-7-methoxycephalosporanic acid

A. 2-[(Cyanomethyl)thio]acetic acid methyl ester 31.8 g. (0.3 mol.) of thioacetic acid methyl ester are added to 150 ml. (0.3 mol.) of 2N sodium methylate solution. 22.6 g. (0.3 mol.) of chloroacetonitrile dissolved in 30 ml. of methanol are added dropwise while cooling and stirring. The mixture is stirred overnight, then refluxed for 30 minutes. The reaction mixture is cooled and the solvent evaporated. 100 ml. of water are added to the residue and the aqueous solution is extracted twice with ether. The combined ether extracts are decolorized with activated carbon and dried with magnesium sulfate. The ether is distilled off and the residue is distilled under vacuum. 30.5 g of 2-[(cyanomethyl)-thio]acetic acid methyl ester are obtained b.p.₁₀ₘₘ 132°–134°.

B. 2-[(Cyanomethyl)thio]acetic acid potassium salt 14.5 g. (0.1 mol.) of 2-[(cyanomethyl)thio]acetic acid methyl ester are dissolved in ethanol and a solution of 6.7 g. (0.12 mol.) of potassium hydroxide in 40 ml. of ethanol is added dropwise while cooling. This is stirred 4 hours at room temperature and 1 hour at 0°. The resulting precipitate is filtered under suction, washed with ethanol and ether and dried. 15.4 g. of 2-[(cyanomethyl)thio]acetic acid, potassium salt, m.p. 203°–205°(dec.) are obtained. The free acid is obtained by dissolving the potassium salt in water and treating with an equivalent amount of aqueous sulfuric acid. The ether solution is dried and concentrated to obtain the free acid.

C. 2-[(Cyanomethyl)thio]acetyl chloride 30 g. of 2-[(cyanomethyl)thio]acetic acid potassium salt are suspended in benzene, 5 drops of pyridine are added and the mixture is cooled to 10°. At this temperature 76.7 g. of oxalyl chloride in 150 ml. of benzene are slowly dropped in with stirring. After the vigorous evolution of gas has stopped, the reaction mixture is stirred for 1 hour at room temperature. This is then filtered and the filtrate is concentrated at room temperature. The residue is distilled under vacuum to obtain 19.8 g of 2-[(cyanomethyl)thio]acetyl chloride, b.p.$_{0.1mm}$ 110°–115°.

D. 7-[2-[(Cyanomethyl)thio]acetamido]-7-methoxycephalosporanic acid

7-Amino-7-methoxycephalosporanic acid, benzhydryl ester (0.01 mol) is dissolved in 50 ml. of acetone and the solution is cooled to 0°–5°. Simultaneously a solution of 1.65 g. (0.01 mol) of 2-[(cyanomethyl)thio]acetyl chloride in 15 ml. of acetone and a solution of 1.4 ml. of triethylamine in 15 ml. of acetone are added dropwise while stirring with care that the pH stays in the range 7.5–8. This is stirred for an additional 30 minutes at 5°. The solvent is then evaporated at reduced pressure at 25°C or less. The residue is dissolved in 200 ml. of ethyl acetate and this solution worked with cold 0.1 N hydrochloric acid, water, cold aqueous 5% sodium bicarbonate. After drying ($Na_2SO_4$), evaporation deposits the benzhydryl ester of the title compound.

The free acid is obtained by dissolving the ester (1 g.) and anisole (500 mg) in 20 ml of ice cold trifluoroacetic acid and keeping it at 0°–5°C for 30 minutes. The acid solvent is evaporated at reduced pressure. The residue is treated with 50 ml of water and the pH adjusted to 7.5 with NaOH to dissolve the product. The solution is washed with ethyl acetate. (Lyophilization of the aqueous solution deposits the sodium salt of the title compound). The aqueous layer is acidified to precipitate the title compound.

EXAMPLE 2

7-[2-[(Cyanomethyl)thio]acetamido]-7-methoxy-3-desacetoxycephalosporanic acid

By substituting 2.45 g of 7-amino-7-methoxy-3-desacetoxycephalosporanic acid benzhydryl ester for the 7-amino-7-methoxycephalosporanic acid benzhydryl ester in the procedure of example 1, there is obtained 7-[2-[(cyanomethyl)thio]acetamido]-7-methoxy-3-desacetoxycephalosporanic acid.

EXAMPLE 3

Pivaloyoxymethyl ester of
7-[2-[(cyanomethyl)thio]acetamido]-7-methoxy cephalosporanic acid Chloromethylpivalate (20 mmole) is combined with 10 mmole of the product of example 1, 0.4 ml of a 5% aqueous sodium iodide solution, and 170 ml of acetone. Triethylamine, 2.0 gm (20 mmole) is added and the mixture stirred for 10 hours, then refluxed for 1 hour. The reaction mixture is cooled and concentrated in vacuo. The residue is partitioned between ethyl acetate, and 5% aqueous sodium bicarbonate. The organic layer is dried over sodium sulfate and evaporated to give the crude product which is obtained as a powder upon trituration with ether.

EXAMPLE 4

Acetoxymethyl ester of
7-[2-[(cyanomethyl)thio]acetamido]-7-methoxy cephalosporanic acid Following the procedure of example 3 but substituting 10 mmole of chloromethyl acetate for the chloromethylpivalate of example 3, the title compound is obtained.

EXAMPLE 5

7-[2-[(Cyanomethyl)thio]acetamido]-7-methoxy-[3-desacetoxy]-cephalosporanic acid, methyl ester A 0.1 molar solution of the product of example 2 in dimethoxyethane is treated with an excess of ethereal diazomethane. Evaporation of the solvent at reduced pressure deposits the title compound.

EXAMPLE 6

7-[2-[(Cyanomethyl)thio]acetamido]-7-methoxycephalosporanic acid, N,N'-dibenzylethylene diamine salt A solution of 0.010 mol. of the product of example 1 in 25 ml of ethanol is added to a solution of 1.20 g. of N,N'-dibenzylethylenediamine in 25 ml. of ethanol at room temperature. After 15 minutes stirring the solvent is evaporated to deposit the title compound.

EXAMPLE 7

7-[2-[(Cyanomethyl)thio]acetamido]-7-methoxycephalosporanic acid, sodium salt

One millimole of the free acid product of example 1 is dissolved in 10 ml of a 0.1 N aqueous NaOH solution. Lyophilization of the solution yields the title compound.

EXAMPLE 8

7-[2-[(Cyanomethyl)thio]acetamido]-7-methoxy-3-desacetoxycephalosporanic acid, calcium salt One millimole of the free acid product of example 2 is dissolved in 10 ml of a 0.05 N aqueous $Ca(OH)_2$ solution. Lyophilization of the solution yields the title compound.

EXAMPLES 9 – 47

The following products are obtained according to the procedure of example 1 by substituting for the 2-[(cyanomethyl)thio]acetyl chloride in part C the appropriately substituted derivative, and when X is H, substituting 7-AMDCA for 7-AMCA; and when X is

substituting 3-carbamoyloxymethyl-7-amino-7-methoxy-$\Delta^3$-cephem-4-carboxylic acid for 7-AMCA; and using the benzhydryl ester in each case in part D:

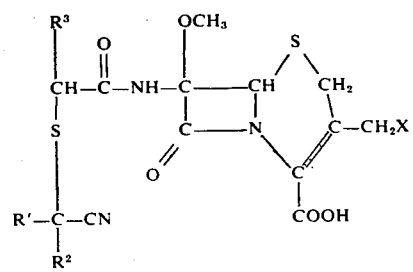

| Example | $R_1$ | $R_2$ | $R_3$ | X |
|---|---|---|---|---|
| 9. | H | H | 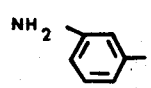 | OCOCH$_3$ |
| 10. | CH$_3$ | H | H | OCOCH$_3$ |
| 11. | C$_2$H$_5$ | C$_2$H$_5$ | CH$_3$ | OCOCH$_3$ |
| 12. | C$_2$H$_5$ | H | C$_3$H$_7$ | OCONH$_2$ |
| 13. | H | H | C$_6$H$_5$CH$_2$— | OCOCH$_3$ |
| 14. | CH$_2$—CH=CH$_2$— | H | 4—ClC$_6$H$_4$— | OCOCH$_3$ |
| 15. |  | H | 3,4-(CH$_3$O)$_2$C$_6$H$_3$— | H |
| 16. | CH$_3$ | CH$_3$ | 3,4,5—(CH$_3$O)$_3$C$_6$H$_2$— | OCOCH$_3$ |
| 17. | 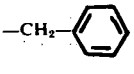 | 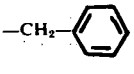 | 4—CH$_3$C$_6$H$_4$— | OCOCH$_3$ |
| 18. | C$_2$H$_5$ | H | 3,4—(Br)$_2$C$_6$H$_3$— | OCONH$_2$ |
| 19. | 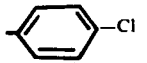 | H | 2,4—(Cl)$_2$C$_6$H$_3$— | OCOCH$_3$ |
| 20. | H | H | 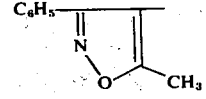 | OCOCH$_3$ |
| 21. | —CH$_2$CH$_2$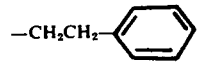 | H |  | OCOCH$_3$ |
| 22. | H | H | 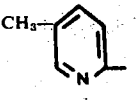 | OCOCH$_3$ |
| 23. | CH$_3$ | H |  | OCOCH$_3$ |
| 24. | —CH$_2$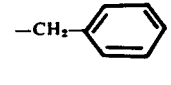 | H |  | OCONH$_2$ |
| 25. | —CH$_2$OH | C$_2$H$_5$ | C$_6$H$_5$— | H |
| 26. | 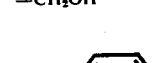 | H | C$_2$H$_5$— | OCOCH$_3$ |
| 27. |  | | C$_6$H$_5$— | H |
| 28. |  | | C$_2$H$_5$— | H |

-continued

| Example | $R_1$ | $R_2$ | $R_3$ | X |
|---|---|---|---|---|
| 29. | cyclohexyl | H | $C_6H_5-$ | $-O-COCH_3$ |
| 30. | $-CH_2-CH=CH_2$ | H | $C_2H_5-$ | H |
| 31. | $CH_3$ | H | $C_6H_5-$ | H |
| 32. | $C_6H_5$ | H | $C_6H_5-$ | $-O-COCH_3$ |
| 33. | H | H | 2-pyrrolyl | $OCOCH_3$ |
| 34. | H | H | 4-pyridyl | $OCOCH_3$ |
| 35. | H | H | 4-$NH_2$-$C_6H_4-$ | H |
| 36. | $CH_3$ | $CH_3$ | $CH_2=CH-CH_2-$ | H |
| 37. | H | H | $CH_3CH=CH-CH_2-$ | $-O-COCH_3$ |
| 38. | H | H | $CH_2=CH-CH_2-CH_2-$ | $OCOCH_3$ |
| 39. | $C_2H_5$ | H | cyclohexyl | H |
| 40. | H | H | $CH_2=CH-CH_2-$ | $OCOCH_3$ |
| 41. | $CH_3$ | H | cyclopentyl | H |
| 42. | H | H | cyclopentyl | $OCOCH_3$ |
| 43. | $C_2H_5$ | H | 1-methyl-4-pyridyl | H |
| 44. | H | H | cyclohexenyl | $OCOCH_3$ |
| 45. | H | H | cyclohexenyl | H |
| 46. | H | H | cyclohexenyl | $OCOCH_3$ |

| Example | R₁ | R₂ | R₃ | X |
|---------|-----|-----|-----|-----|
| | | -continued | | |
| 47. | CH₃ | H |  | H |

EXAMPLE 48

7-[2-[(cyanomethyl)thio]acetamido]-7-methoxy-3-[2-(1,3,4-thiadiazolyl)thiomethyl]-Δ³-cephem-4-carboxylic acid A solution (0.026 mole) of the product of Example 1, NaHCO₃ (2.1 g.) and 3.8 g. 2-mercapto-1,3,4-thiazdiazole in 200 ml. of pH 6.5 phosphate buffer is stirred for 5.5 hours at 60° C. The reaction is cooled to room temperature, acidified to pH 3 and extracted with ethyl acetate. The ethyl acetate layer is worked up with saturated NaCl solution, dried (Na₂SO₄), and evaporated at reduced pressure to deposit the product.

EXAMPLES 49 – 51

Following the procedure of Example 48 but substituting for 2-mercapto-1,3,4-thiadiazole, the heterocyclylthio compound listed below in column I there is obtained respectively the final compound of column II.

| | I | II |
|---|---|---|
| 49. | Pyridinyl-1-oxo-2-thiol | 7-[2-[(cyanomethyl)thio]-acetamido]-7-methoxy-3-[2-(1-oxopyridyl)thiomethyl]-Δ³-cephem-4-carboxylic acid |
| 50. | 3-methyl-1,2,4-thiadiazolyl-5-thiol | 7-[2-[(cyanomethyl)thio]-acetamido]-7-methoxy-3-[5-(3-methyl-1,2,4-thiadiazolyl)-thiomethyl]-Δ³-cephem-4-carboxylic acid |
| 51. | 1-methyltetrazolyl-5-thiol | 7-[2-[(cyanomethyl)thio]-acetamido]-7-methoxy-3-[5-(1-methyltetrazolyl)-thiomethyl]-Δ³-cephem-4-carboxylic acid |

EXAMPLE 52

7-[2-[(Cyanomethyl)thio]acetamido]-7-methoxycephalosporanic acid

A solution containing 0.10 moles of the cyanomethyl thio acetic acid in 100 ml. of acetone containing 10.1 g. of triethylamine at a temperature of from about 0°C to about −20°C is converted to a mixed carbonic anhydride by treating with 10.8 g of ethyl chloroformate for about 30 minutes. A cold (about −10°C) solution of 0.10 mol of 7-amino-7-methoxycephalosporanic acid, trichloroethyl ester (prepared as described in Netherlands Pat. No. 7,204,982) in 400 ml. of 1:1 acetone containing 10.1 g of triethylamine is added to the solution of mixed anhydride and the reaction mixture stirred vigorously at about 0°C for approximately 30–45 minutes. The volume of the solution is reduced by evaporating the bulk of the acetone at reduced pressure at room temperature or below.

One liter of ethyl acetate is added and the solution washed with 2 × 200 ml of ice cold 5% aqueous sodium bicarbonate, 100 ml of water, 2 × 200 ml of 0.5 molar hydrochloric acid, and 100 ml again of water. The ethyl acetate solution is dried (Na₂SO₄) and evaporated to deposit the trichloroethyl ester of the title compound.

The free acid is obtained by dissolving the ester (1 g) in 30 ml of cold 90% acetic acid and adding 1 g of zinc to the vigorously stirred solution. After 1 hour the acid solvent is evaporated at reduced pressure. The residue is treated with 50 ml of water and the pH adjusted to 7.5 with NaOH to dissolve the product. The solution is washed with ethyl acetate. (Lyophilization of the aqueous solution deposits the sodium salt of the title compound). The aqueous layer is acidified to precipitate the title compound.

EXAMPLE 53

A sterile powder for reconstitution for use intramuscularly is prepared from the following ingredients which supply 1000 vials each containing 250 mg. of active ingredient:

| | |
|---|---|
| 7-[2-[(Cyanomethyl)thio]acetamido]-7-methoxy cephalosporanic acid, Na salt, sterile | 250 gm. |
| Lecithin powder, sterile | 50 gm. |
| Sodium carboxymethylcellulose, sterile | 20 gm. |

The sterile powders are aseptically blended, subdivided, filled into sterile vials and sealed. The addition of 1 ml. of water for injection to the vial provides a suspension for intramuscular injection.

EXAMPLE 54

Tablets are prepared from the following ingredients:

| | |
|---|---|
| 7-[2-(Cyanomethyl)thio]acetamido]-7-methoxy cephalosporanic acid, pivaloyloxymethyl ester | 5 kg. |
| Polyvinyl pyrrolidone | 360 gm. |
| Lactose | 780 gm. |
| Talc | 80 gm. |
| Magnesium stearate | 80 gm. |

The active substance is mixed with the lactose and granulated with an ethanol solution of the polyvinyl pyrrolidone. The wet material is screened, then dried at 45°. The dried material is screened and admixed with the talc and magnesium stearate. The mixture is compressed in a tableting machine to obtain 10,000 tablets weighing a total of 630 mg. each and containing 500 mg. of active ingredient.

What is claimed is:

1. A compound of the formula

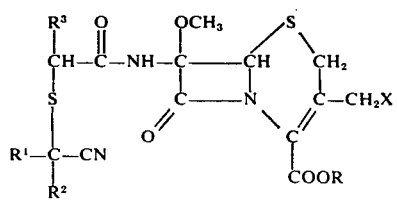

wherein R is hydrogen, alkyl of 1 to 3 carbon atoms, haloalkyl of 1 to 3 carbons, benzyl, phenethyl, benzhydryl, trialkylsilyl wherein the alkyl has 1 to 4 carbon atoms, a salt forming ion selected from the group consisting of aluminum, alkali metal, alkaline earth metal, methylamine, ethylamine, dimethylamine, triethylamine, dibenzylamine or

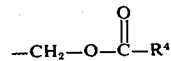

wherein $R^4$ is alkyl of 1 to 5 carbon atoms, phenyl or benzyl;

$R^1$ and $R^2$ each is hydrogen, alkyl of 1 to 5 carbon atoms, alkenyl of 2 to 5 carbon atoms, phenyl, benzyl or phenethyl of $R^1$ and $R^2$ together with the carbon to which they are attached form cycloalkyl of 4 to 7 carbon atoms;

$R^3$ is hydrogen, alkyl of 1 to 5 carbon atoms, or alkenyl of 2 to 5 carbon atoms; and X is hydrogen, acetoxy, carbamoyloxy, pyridinium, pyridyl-1-oxo2-thio, 3-methyl-1,2,4-thiadiazolylthio, 1-methyltetrazolyl-5-thio or 2-methyl-1,3,4-thiadiazolyl-5-thio.

2. A compound as in claim 1 wherein R is hydrogen or alkali metal; $R^1$ and $R^2$ each is hydrogen, alkyl of 1 to 5 carbon atoms, alkenyl of 2 to 5 carbon atoms, phenyl, hydroxyphenyl, chlorophenyl, benzyl, phenethyl or $R^1$ and $R^2$ together complete the cyclopentyl or cyclohexyl ring; $R^3$ is hydrogen or alkyl of 1 to 5 carbon atoms; and X is hydrogen, acetoxy, carbamoyloxy, pyridinyl-1-oxo2-thio, 3-methyl-1,2,4-thiadiazolylthio, 1-methyltetrazolyl-5-thio, 2-methyl-1,3,4-thiadiazolyl-5-thio or pyridinium.

3. A compound as in claim 1 wherein R is hydrogen, sodium or potassium; $R^1$ and $R^2$ each is hydrogen, methyl, ethyl, allyl, phenyl, hydroxyphenyl, chlorophenyl, benzyl or phenethyl; $R^3$ is hydrogen, methyl, ethyl, or allyl; and X is hydrogen, acetoxy, carbamoyloxy, pyridinyl-1-oxo-2-thio, 3-methyl-1,2,4-thiadiazolylthio, 1-methyltetrazolyl-5-thio, 2-methyl-1,3,4-thiadiazolyl-5-thio or pyridinium.

4. A compound as in claim 1 wherein R is hydrogen or alkali metal; $R^1$ and $R^2$ each is hydrogen, alkyl of 1 to 5 carbon atoms, alkenyl of 2 to 5 carbon atoms, benzyl or phenethyl; $R^3$ is hydrogen, alkyl of 1 to 5 carbon atoms or alkenyl of 2 to 5 carbon atoms; and X is hydrogen, acetoxy or pyridinium.

5. A compound as in claim 4 wherein $R^1$ and $R^2$ each is hydrogen.

6. A compound as in claim 4 wherein R, $R^1$, $R^2$ and $R^3$ each is hydrogen and X is hydrogen, acetoxy or pyridinium.

7. A compound as in claim 6 wherein X is acetoxy.

8. A compound as in claim 6 wherein X is hydrogen.

9. A compound as in claim 1 wherein R, $R^1$, $R^2$ and $R^3$ each is hydrogen and X is 1-methyltetrazolyl-5-thio.

10. A compound as in claim 1 wherein R, $R^1$, $R^2$ and $R^3$ each is hydrogen and X is 3-methyl-1,2,4-thiadiazolylthio.

11. A compound as in claim 7 wherein R is sodium, $R^1$, $R^2$ and $R^3$ each is hydrogen and X is acetoxy.

* * * * *